US012560512B2

(12) United States Patent
Benajes Calvo et al.

(10) Patent No.: US 12,560,512 B2
(45) Date of Patent: Feb. 24, 2026

(54) DEVICE AND METHOD FOR EMULATING FORCED INDUCTION SYSTEMS

(71) Applicant: UNIVERSITAT POLITECNICA DE VALENCIA, Valencia (ES)

(72) Inventors: Jesús Vicente Benajes Calvo, Valencia (ES); Vicente Remigio Bermudez Tamarit, Valencia (ES); José María Desantes Fernandez, Valencia (ES); Vicente Dolz Ruiz, Valencia (ES); José Galindo Lucas, Valencia (ES); Ricardo Novella Rosa, Valencia (ES); José Ramón Serrano Cruz, Valencia (ES)

(73) Assignee: UNIVERSITAT POLITECNICA DE VALENCIA, Valencia (ES)

( * ) Notice: Subject to any disclaimer, the term of this patent is extended or adjusted under 35 U.S.C. 154(b) by 316 days.

(21) Appl. No.: 18/547,059

(22) PCT Filed: Mar. 4, 2022

(86) PCT No.: PCT/ES2022/070124
§ 371 (c)(1),
(2) Date: Aug. 18, 2023

(87) PCT Pub. No.: WO2022/189684
PCT Pub. Date: Sep. 15, 2022

(65) Prior Publication Data
US 2024/0044744 A1 Feb. 8, 2024

(30) Foreign Application Priority Data
Mar. 11, 2021 (ES) .................................. 202130214

(51) Int. Cl.
*G01M 15/04* (2006.01)

(52) U.S. Cl.
CPC .................................... *G01M 15/04* (2013.01)

(58) Field of Classification Search
CPC ........ G01M 15/04; G01M 15/02; Y02T 10/12
See application file for complete search history.

(56) References Cited

U.S. PATENT DOCUMENTS 6,938,420 B2 * 9/2005 Kawamura ......... F02D 41/0007
60/609
7,621,262 B2 * 11/2009 Zubeck .................... B60K 6/46
123/543
(Continued)

FOREIGN PATENT DOCUMENTS

CN 106525440 A 3/2017
JP 2007263040 A 10/2007
(Continued)

*Primary Examiner* — Freddie Kirkland, III
(74) *Attorney, Agent, or Firm* — LUCAS & MERCANTI, LLP

(57) ABSTRACT

The present invention relates to a device for the dynamic emulation of forced induction systems of propulsion sources, which comprises an inlet tube (2), an outlet tube (4), a turbine set (12), one or more electric compressors (14), a cooling means (20), a heating means (24), and a heat regulation means. The present invention also relates to a method comprising one or more of the following actions: regulating supply air pressure by controlling the rotation regime of the one or more electric compressors (14); controlling the operating conditions of the one or more electric compressors (14), using a safety means; regulating supply air temperature, using the heat regulation means; regulating the counterpressure of the outlet gases of the propulsion source (10), by modifying the geometry of the turbine of the turbine set (12).

19 Claims, 3 Drawing Sheets

(56)                    References Cited

U.S. PATENT DOCUMENTS

| | | | |
|---|---|---|---|
| 10,001,069 B2 * | 6/2018 | Shin ..................... | B60W 20/16 |
| 10,006,414 B2 * | 6/2018 | Ariizumi ............... | F02M 26/17 |
| 10,012,136 B2 * | 7/2018 | Shor .................... | F02B 39/085 |
| 10,100,719 B2 * | 10/2018 | Moore ............. | F02M 35/10157 |
| 10,378,433 B2 * | 8/2019 | Kemmerling .......... | F02B 39/10 |
| 10,379,002 B2 * | 8/2019 | Desantes Fernández et al. ......... | |
| | | | G01M 15/02 |
| 10,508,590 B2 * | 12/2019 | Finn .................... | F02D 41/0007 |
| 10,526,955 B2 * | 1/2020 | Ehrhard ................ | F02B 37/005 |
| 11,060,497 B2 * | 7/2021 | Sellnau .............. | F02B 29/0412 |
| 2004/0194466 A1 | 10/2004 | Kawamura et al. | |
| 2008/0276913 A1 | 11/2008 | Zubeck | |
| 2014/0251252 A1 | 9/2014 | Wasada et al. | |
| 2015/0114339 A1 * | 4/2015 | Sellnau .............. | F02B 29/0412 |
| | | | 123/294 |
| 2015/0361868 A1 * | 12/2015 | Mahakul ............ | F02B 29/0493 |
| | | | 123/41.44 |
| 2016/0186701 A1 * | 6/2016 | Ariizumi ................ | F02B 37/16 |
| | | | 60/280 |
| 2016/0349147 A1 | 12/2016 | Desantes Fernández et al. | |
| 2017/0218834 A1 | 8/2017 | Kemmerling et al. | |
| 2018/0180013 A1 * | 6/2018 | Sellnau .............. | F02B 29/0443 |
| 2022/0362785 A1 * | 11/2022 | Orupold ............ | B01D 21/2416 |

FOREIGN PATENT DOCUMENTS

| | | | |
|---|---|---|---|
| JP | 2008281002 A | 11/2008 | |
| JP | 2018508409 A | 3/2018 | |
| JP | 2019105191 A | 6/2019 | |

* cited by examiner

DEVICE AND METHOD FOR EMULATING FORCED INDUCTION SYSTEMS

CROSS-REFERENCE TO RELATED APPLICATIONS

This application is a national phase entry under 35 U.S.C. § 371 of International Application PCT/ES2022/070124, filed Mar. 4, 2022, which claims the benefit under 35 U.S.C. § 119(e) of Spain Application No. P202130214, filed Mar. 11, 2021, all of which are herein incorporated by reference in their entirety.

FIELD OF THE ART

The present invention relates generally to the sector of forced induction systems, and more specifically to the emulation of forced induction systems of propulsion sources such as, for example, reciprocating internal combustion engines, fuel cells, etc.; emulation which is performed in the phase of designing said forced induction systems and/or propulsion sources.

BACKGROUND OF THE INVENTION

In the manufacture of multi-cylinder engines, it is common practice to first design an engine with a single cylinder (single-cylinder engine) that serves as the basis for the subsequent development of the multi-cylinder engine.

In order to reduce costs, in recent times there has been a widespread trend to design a single base cylinder, and to reproduce the base cylinder as many times as necessary to obtain different multi-cylinder engines; that is, to manufacture 3, 4, 6, 12-cylinder engines with cylinders of one and the same type, which are like the base cylinder.

This circumstance also occurs in the manufacture of other types of propulsion sources such as the case, for example, of multi-cell fuel cells: a base cell is first designed, and then several cells are implemented as the base cell to obtain the multi-cell fuel cell.

Propulsion sources (such as engines or fuel cells) are typically coupled to forced induction systems to increase their power. Accordingly, forced induction systems are also a common design focus.

In the design of forced induced propulsion sources it is necessary to take into account multiple operating conditions, both static and dynamic, that the propulsion source may encounter during its service life. In this way, during the development of the propulsion source it is common to simulate different operating conditions in order to analyze its response. This is a delicate task, since achieving a propulsion source that adequately meets expectations depends on its development.

Devices and methods relating to improved engine performance are known in the prior art.

For example, various types of devices and methods for measuring steady-state engine pumping losses are known. Some of said known devices and methods are disclosed in documents US2015211961A1 (Pumping loss calculation device for internal combustion engine), EP1347163A1 (Method for estimating pumping loss in an internal combustion engine), and US2009018748A1 (System and method for a pumping torque estimation model). These devices and methods are intended for measuring pumping losses only in steady state (i.e., in static and non-dynamic conditions).

Devices and methods for optimizing engine operation are also known, as disclosed, for example, in document WO2019118834A1 (Cam phasing control for thermal management), which presents a way to optimize thermal management (to reduce heat losses) of engines by controlling valve opening by means of a cam synchronizer.

Other devices and methods for the forced induction of engines are also known, as disclosed, for example, in documents EP2023117A1 (Method for supercharging a one-cylinder engine) and FR2891050A1 (Air supercharging plant for diesel-type single-cylinder test bench).

Devices or installations which allow conditioning air in order to supply it to an engine during a test are also known, such that the conditioning simulates certain air conditions depending on a simulated altitude above sea level, as disclosed in documents ES2485618A1 (Device for atmosphere conditioning for testing combustion engines) and ES2398095A1 (Installation for simulating the pressure and temperature conditions of the air drawn in by a reciprocating internal combustion engine).

However, none of the aforementioned documents allows emulating dynamic conditions (i.e., in transient state) of forced induced propulsion sources, before having designed or selected the forced induction system. In particular, the devices of documents ES2485618A1 and ES2398095A1, for example, cannot give a suitable dynamic response mainly because they do not allow independently controlling the intake pressure of the engine with respect to the exhaust counterpressure of said engine. In other words, they do not allow emulating forced induction independently of the exhaust counterpressure of the engine. In fact, these devices are designed so that the intake pressure and exhaust counterpressure are the same. In order to be able to simulate atmospheric conditions based on altitude, it is an essential requirement that the intake area and exhaust area of the engine are kept at the same pressure during the test; to that end, these devices comprise a communication duct between the intake area and the exhaust area of the engine, which causes both pressures (intake pressure and exhaust counterpressure) to be equalized.

A significant part of the situations encountered by forced induced propulsion sources during their service life involve dynamic operating conditions. Therefore, there is still a need in the art for a device that allows performing a dynamic emulation (in transient state) of the response of a propulsion source (e.g., a reciprocating internal combustion engine or a fuel cell) coupled to a forced induction system, in order to be able to design and develop said propulsion source and/or forced induction system associated with a propulsion source. More specifically, it would be desirable to have a device that allows performing a dynamic emulation of accelerations and decelerations of the forced induction systems of the forced induced or turbo-induced propulsion sources.

SUMMARY OF THE INVENTION

To solve the preceding technical problem, the present invention relates to a device for the dynamic emulation of forced induction systems. Specifically, the invention relates to a device which allows dynamically emulating pressure and temperature variations experienced by the supply air in a forced induced propulsion source such as, for example, the combustion air in a turbo/forced induced reciprocating internal combustion engine (RICE) or the air that circulates through the cathode in a turbo/forced induced fuel cell.

More specifically, a first aspect of the invention relates to a device for the dynamic emulation of forced induction systems of propulsion sources, comprising:

an inlet tube configured to be connected at one end to an intake of a propulsion source, and to suction air from the environment at the other end, referred to as suction end, for using the air suctioned from the environment as supply air for the propulsion source;

an outlet tube configured to be connected at one end to an exhaust of the propulsion source, and to expel outlet gases of the propulsion source into the environment at the other end, referred to as discharge end;

a turbine set comprising a turbine with a variable geometry in the outlet tube and a compressor in the inlet tube, coupled to the turbine, such that the turbine set is configured so that the turbine meets the counterpressure gradients of the outlet gases and recovers part of the energy available in said gases to compress the supply air by means of the compressor;

one or more electric compressors in the inlet tube, placed in series with the compressor of the turbine set, configured to compress the supply air and reproduce in a controlled manner pressure gradients of the supply air;

a cooling means arranged in series with the one or more electric compressors, configured to cool the supply air;

a heating means configured to heat the supply air;

a heat regulation means for the supply air, configured to regulate the mixture of at least one cold supply air flow proceeding from the cooling means and a hot supply air flow proceeding from the heating means, and to thereby regulate supply air temperature independently with respect to the pressure thereof; such that the supply air temperature gradient is controlled accurately, overcoming the thermal inertia of the cooling means and the heating means.

A second aspect of the present invention relates to a method for the dynamic emulation of forced induction systems of propulsion sources, using a device for emulation according to the first aspect of the present invention. The method for emulation comprises suctioning air from the environment to use it as supply air for the propulsion source; feeding the supply air to the propulsion source; expelling to the environment outlet gases of the propulsion source; with the particularity that one or more of the following actions are performed:

regulating supply air pressure by controlling the rotation regime of the one or more electric compressors;

controlling that the operating conditions of the one or more electric compressors are always suitable, using a safety means;

regulating supply air temperature, using the heat regulation means;

regulating the counterpressure of the outlet gases of the propulsion source, by modifying the geometry of the turbine of the turbine set.

The device and method for the dynamic emulation of forced induction systems according to the present invention can be applied to propulsion sources such as single-cylinder research RICEs, naturally aspirated or atmospheric RICEs of any type, fuel cells of any type, etc. In all these cases, it is of great interest to have this device and method for dynamic emulation to be able to quickly and efficiently evaluate in an experimental manner the coupling of a propulsion source with different turbo/forced induction systems under dynamic conditions.

Some of the aspects and most significant advantages which can be obtained by means of the device and method for the dynamic emulation of forced induction systems are as follows:

They allow controlling the dynamic evolution of the supply air pressure and temperature of the propulsion source (for example, combustion air in an engine, or air that circulates through the cathode of a fuel cell), emulating a transient state of acceleration of the turbo/forced induction system.

They allow simulating the impact of the variations described in the preceding point on performance (and emissions, if this is the case) of the propulsion source (for example, a Single-cylinder or multi-cylinder RICE, a naturally aspirated RICE of any type, a fuel cell of any type, etc.) during transient states of loading controlled by the turbo/forced induction system.

They allow experimentally emulating any turbo/forced induction technology applicable to propulsion sources (for example, RICEs or fuel cells) to select the optimal technology depending on the propulsion source object of study.

They allow sizing experimentally the turbo/forced induction system for a given propulsion source (for example, RICEs or fuel cells) considering the dynamic behavior of the assembly.

They allow accelerating the design phase of forced induced power plants (for example, RICE- or fuel cell-based forced induced power plants) for any industrial application and particularly for applications associated with the transport in which these devices work under highly transient conditions.

Throughout the description and claims, the word "comprises" and variants thereof do not intend to exclude other technical features, additions, components, or steps. Furthermore, the word "comprises" includes the case "consists of". For those skilled in the art, other objects, advantages, and features of the invention will be inferred in part from the description and in part from practice of the invention. The following examples are provided by way of illustration and are not intended to be limiting of the present invention. Furthermore, the present invention covers all the possible combinations of particular embodiments indicated herein.

BRIEF DESCRIPTION OF THE DRAWINGS

The present invention will be better understood in reference to the following figures, where the following is depicted in an illustrative and non-limiting manner.

DETAILED DESCRIPTION OF PREFERRED EMBODIMENTS

Figure 1:
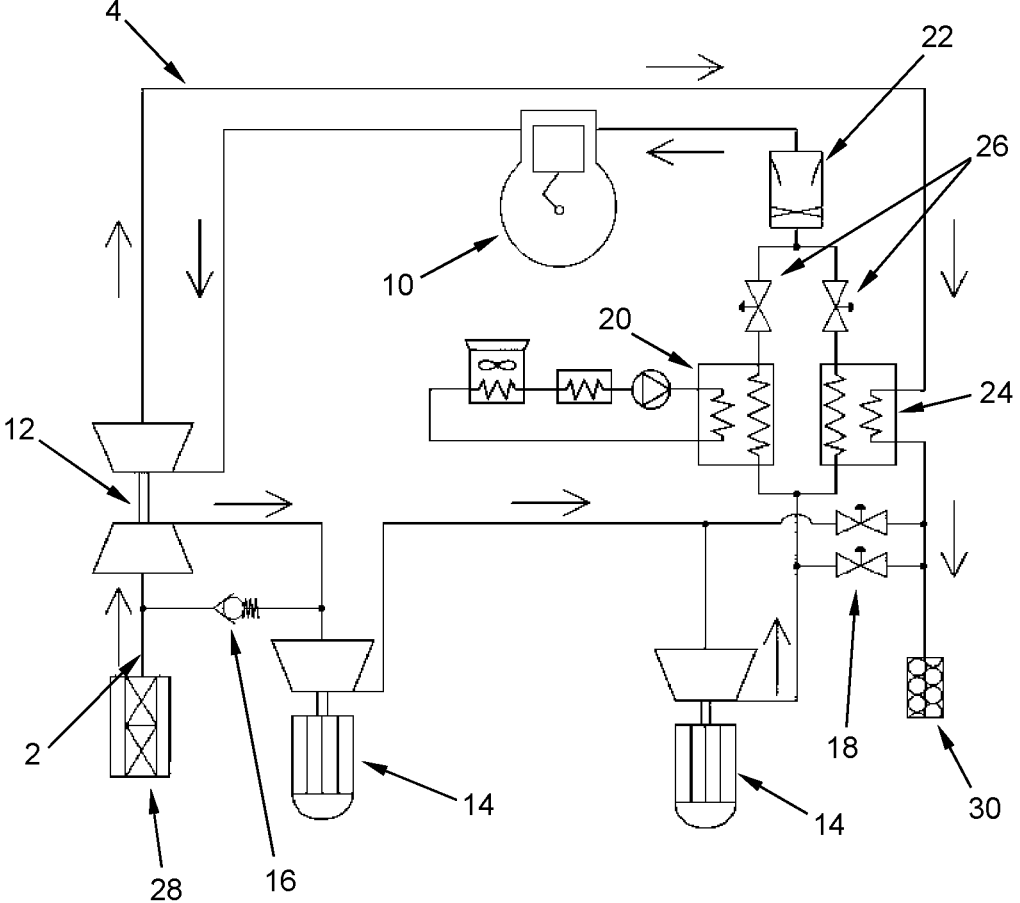
FIG. 1 is a schematic depiction of the system for dynamic emulation according to a preferred embodiment of the present invention.

According to a first aspect, the present invention relates to a device for the dynamic emulation of forced induction systems of propulsion sources such as, for example, a forced induction system of a reciprocating internal combustion engine, a forced induction system of a fuel cell, etc.

The device is intended for emulating pressure and temperature gradient ranges for flow rate ranges of a turbo/forced induced propulsion source.

Within the context of the present invention, "dynamic" emulation is understood to mean the ability to reproduce a wide pressure and temperature gradient range, in an independent and accurate manner, which provides a significant difference with respect to the current state of the art. These gradients correspond with those that can be reached in a propulsion source with any turbo/forced induction technology, including electrically assisted turbine sets.

The device for the dynamic emulation according to the preferred embodiment of the present invention comprises an inlet tube (2), an outlet tube (4), a turbine set (12), and one or more compressors, preferably of electric compressor type (14), as explained below:

The inlet tube (2) is configured to be connected at one end to an intake of a propulsion source (10), and to suction air from the environment at the other end, referred to as suction end. The air suctioned from the environment is used as supply air for the propulsion source (10).

As it is used herein, the term "inlet tube" must be understood in a broad and non-limiting sense, encompassing not only a single tube, but any assembly of ducts intended for the passage of supply air between the environment and the propulsion source (10).

The outlet tube (4) is configured to be connected at one end to an exhaust of the propulsion source (10), and to expel outlet gases of the propulsion source (10) into the environment at the other end, referred to as discharge end.

As it is used herein, the term "outlet tube" must be understood in a broad and non-limiting sense, encompassing not only a single tube, but any assembly of ducts intended for the passage of outlet gases between the propulsion source (10) and the environment.

According to a preferred embodiment, the tubes of the device for emulation are DN50 tubes.

The turbine set (12) comprises a turbine with a variable geometry and a compressor coupled to the turbine. The turbine is arranged in the outlet tube (4), and the compressor in the inlet tube (2). In this way, the turbine set (12) is configured so that the turbine meets the counterpressure gradients of the outlet gases and recovers part of the energy available in said outlet gases to compress the supply air by means of the compressor.

According to a preferred embodiment, the turbine set (12) has a power of 10 kW. Preferably, the turbine of the turbine set (12) is a centripetal radial turbine.

According to a particular embodiment, the device for emulation comprises several turbine sets for the purpose, for example, of emulating the operation of a twin-turbo.

Within the context of the present invention, electric compressor is understood to mean a compressor mechanically moved by an electric engine. The one or more electric compressors (14) are arranged in the inlet tube (2); and are placed in series with the compressor of the turbine set (12). The one or more electric compressors (14) are configured to compress the supply air and reproduce, in a controlled manner, the pressure gradients of the supply air.

In cases in which the forced induction demand is not very high, the existence of a single electric compressor (14) may be sufficient. Preferably, the device for emulation comprises several electric compressors (14), which allows covering situations in which the forced induction needs are greater. According to the embodiments shown in FIGS. 1, 2, and 3, the device for emulation comprises several electric compressors (14) arranged in series with respect to one another and with the compressor of the turbine set (12). In this case, the fact that the electric compressors (14) are arranged in series with respect to one another, favors the ability of the device for emulation to achieve high levels of supply air pressure and to reproduce in a controlled manner high pressure gradients of the supply air.

According to a preferred embodiment, the one or more electric compressors (14) are radial centrifugal compressors. Preferably, the one or more electric compressors (14) have a total power of 20 kW, and more preferably with 11 kW for low pressure and 9 kW for high pressure.

The present invention has been developed taking into account the need to enable dynamic emulations to be performed, as explained below: The device of the present invention allows independently controlling the intake pressure and the exhaust counterpressure of the propulsion source (10). More specifically, the intake area and the exhaust area of the propulsion source (10) do not communicate with one another, such that the independence of the intake pressure with respect to the exhaust counterpressure is guaranteed; a circumstance that can be seen in FIGS. 1, 2, and 3. As a result of said independence, the device can carry out dynamic emulations of forced induction systems of propulsion sources.

According to a preferred embodiment, the device for dynamic emulation also comprises a cooling means (20). Preferably, the cooling means (20) is placed in series with the electric compressors (14). The cooling means (20) is configured to cool the supply air, preferably after having been heated during compression. In this way, as a result of the cooling means (20), the "supply air temperature" parameter is made independent with respect to the "supply air pressure" parameter.

According to the preferred embodiment shown in FIG. 1, the cooling means (20) is arranged downstream of the two electric compressors (14). According to another embodiment, the cooling means (20) can be arranged between the two electric compressors (14).

Preferably, the cooling means (20) is a heat exchange-type cooler. The cooling means (20) can use as a cooling source a suitable liquid coolant (such as water from a cooling tower, room temperature tap water, etc.), a reverse Rankine cycle-based cooling machine, etc. A combination of different types of cooling can also be used as a cooling source; for example, according to an embodiment shown in FIG. 1, the cooling source is a combination of cooling with water from a cooling tower and cooling with a reverse Rankine cycle.

According to a preferred embodiment, the cooling means (20) has a power of 15 kW.

Figure 2:
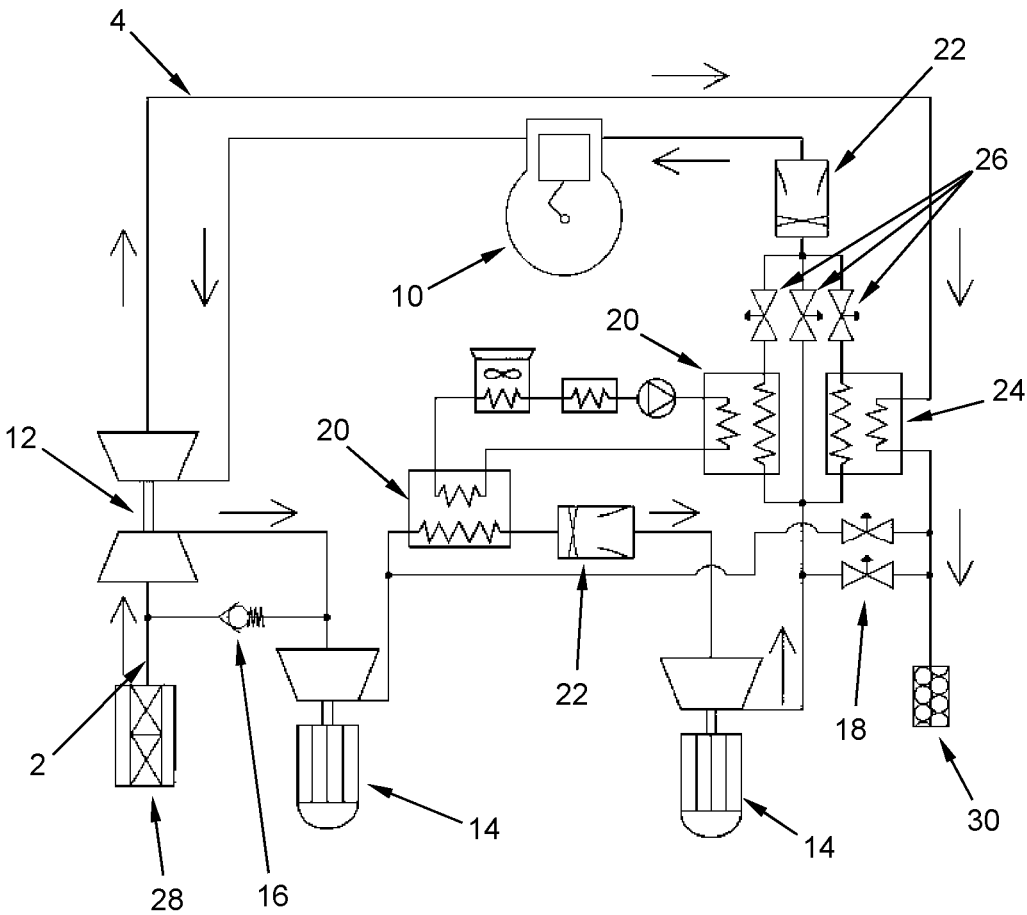
FIG. 2 is a schematic depiction of the system for dynamic emulation according to another preferred embodiment of the present invention, with two cooling means.
Figure 3:
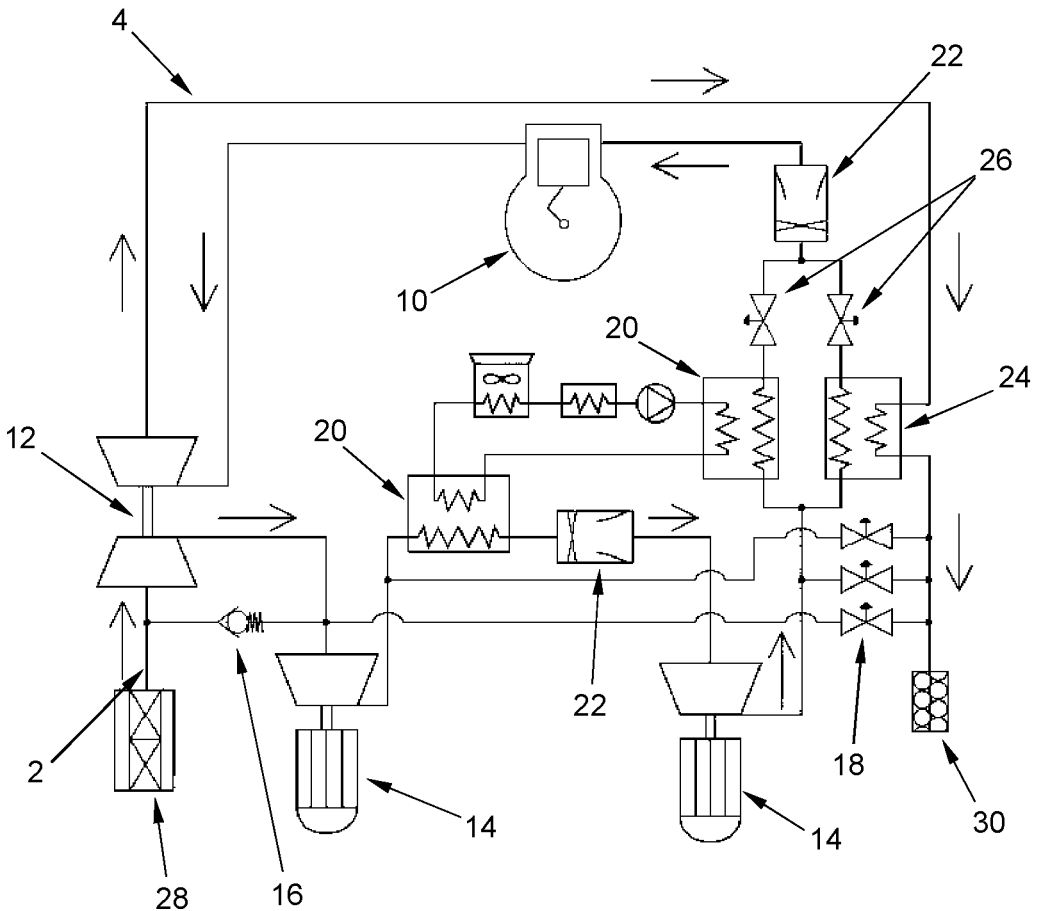
FIG. 3 is a schematic depiction of the system for dynamic emulation according to another preferred embodiment of the present invention, with two cooling means, as well as three purge valves associated with a compressor of a turbine set and two electric compressors, respectively.

According to a preferred embodiment, the device for dynamic emulation also comprises a heating means (24). The heating means (24) is configured to heat supply air. In this way, as a result of the heating means (24), the "supply air temperature" parameter is made independent with respect to the "supply air pressure" parameter. As shown in FIGS. 1, 2, and 3, the heating means (24) is preferably a regenerator. The regenerator is configured to recover heat from the outlet gases of the propulsion source (10) circulating through the outlet tube (4), and to use said heat for heating the supply air circulating through the inlet tube (2).

According to a preferred embodiment, the heating means (24) has a power of 40 kW.

Taking into account that the supply air is also heated when being compressed: according to a particular embodiment, it can be considered that the heating means (24) is made up of the actual compressor of the turbine set (12) and the one or more electric compressors (14) themselves, such that an additional device for heating the supply air is dispensed with. In this case, in order to make the "supply air temperature" parameter independent with respect to the "supply air pressure" parameter, a means specific to that end, such as the aforementioned cooling means (20), can be implemented.

According to a preferred embodiment, the device for dynamic emulation also comprises a heat regulation means. The heat regulation means is configured to regulate the mixture of at least one cold supply air flow proceeding from the cooling means (20) and a hot supply air flow proceeding from the heating means (24), which allows supply air temperature to be regulated in an independent manner with respect to the pressure thereof. As a result of the heat regulation means, supply air temperature gradients can be controlled accurately, overcoming the thermal inertia of the cooling means (20) and the heating means (24).

According to a preferred embodiment, the device for dynamic emulation comprises the inlet tube (2), the outlet tube (4), the turbine set (12), the one or more electric compressors (14), the cooling means (20), the heating means (24), and the heat regulation means.

Different features of the heat regulation means are described below according to a preferred embodiment:

The heat regulation means is integrated in a circuit of parallel branches. Preferably, the circuit of branches is located downstream of the one or more electric compressors (14); i.e., downstream of the electric compressor (14) in the case that there is only one, or of the electric compressor (14) which is arranged last (according to the embodiments of FIGS. 1, 2, and 3, the second electric compressor (14) which is located farther downstream) in the case of there being several electric compressors (14).

The heat regulation means comprises one or more mixing valves (26) arranged in one or more of the branches, respectively, regulating the flow rate of the supply air flow through the corresponding branch thereof.

According to the Embodiment Shown in FIG. 1

The circuit of branches has two branches which originate through a fork of the inlet tube (2) and converge again at a convergence point upstream of the propulsion source (10). Preferably, the heating means (24) is arranged in one branch and the cooling means (20) is arranged in the other branch, such that they are arranged in parallel. The heat regulation means has two mixing valves (26) arranged in respective branches (a mixing valve in one branch and another mixing valve in another branch), which regulate the flow rate of the hot supply air flow and the flow rate of the cold supply air flow, respectively, through the corresponding branch. The mixing at constant pressure of both flows at the convergence point, and accordingly the supply air temperature gradient, is thereby controlled.

According to the Embodiment Shown in FIG. 2

The circuit of branches has three branches. Preferably, the heating means (24) is arranged in one branch, a cooling means (20) is arranged in another branch, and the remaining branch runs without going through any heating or cooling means, such that the supply air flow that circulates through this remaining branch does not experience temperature change (referred to as neutral supply air flow). The heat regulation means has three mixing valves (26) arranged in respective branches (one mixing valve for each of the three branches), which regulate the flow rate of the hot supply air flow, the flow rate of the cold supply air flow, and the flow rate of the neutral supply air flow, respectively, through the corresponding branch. The mixing at constant pressure of the flows, and accordingly the supply air temperature gradient, is thereby controlled.

In addition to the configurations that have been explained, the heat regulation means and the circuit of branches in which it is integrated can have other configurations: For example, according to an alternative embodiment, instead of one mixing valve (26) for each branch, the heat regulation means comprises a thermostatic mixing valve (26) arranged at a convergence point of branches. According to another embodiment in which the circuit of branches has two branches, one branch runs without going through any heating or cooling means (for example, because the cooling means is not arranged in the branches), such that the supply air flow that circulates through this branch does not experience temperature change. According to another embodiment, one or more of the branches can be without a mixing valve (26).

According to a preferred embodiment, the mixing valves (26) are linearly regulating knife gate valves, preferably DN100, and more preferably Schuber & Saltzer G S type valve. Preferably, the mixing valve (26) of the branch corresponding to the hot supply air flow is a high-temperature valve which, for example, allows operating temperatures of up to 550° C.

According to a preferred embodiment, the device for dynamic emulation comprises one or more condensate separators (22), configured to remove condensed water from the moisture of the supply air. This thereby prevents condensed water from damaging the device for emulation or the propulsion source (10). As is known, condensation can appear under different circumstances such as, for example, after cooling, compression, a combination of both, due to heat losses, etc. To that end, the one or more condensate separators (22) can be arranged at different locations on the device for emulation according to needs such as, for example, after an electric compressor (14), after a cooling means (20), etc.

According to an Embodiment Shown in FIG. 1

The device for emulation comprises a condensate separator (22) in the inlet tube (2), downstream of the cooling means (20) of the circuit of branches; specifically downstream of the circuit of branches (in which the heat regulation means is integrated) and upstream of the propulsion source (10).

According to the Embodiments of FIGS. 2, 3

In addition to the condensate separator (22) shown in FIG. 1, the device for emulation comprises another condensate separator (22). This another condensate separator (22) is located between the two electric compressors (14), downstream of the cooling means (20) which is also located between the two electric compressors (14). As a result of said arrangement, this another condensate separator (22)

prevents the electric compressor located in the second place from being damaged by condensates.

According to a preferred embodiment, the one or more condensate separators (22) are axial cyclonic separators. Preferably, the one or more condensate separators (22) have a DN150 diameter.

According to a preferred embodiment, the device for emulation comprises a safety means configured to control that the operating conditions of the one or more electric compressors (14) are always suitable, in terms of safety, preventing those conditions that may be hazardous for the electric compressors (14), the propulsion source (10), or other components of the device for emulation. Preferably, the safety means comprises one or more air purge valves (18) associated with the one or more electric compressors (14), respectively (one purge valve for each electric compressor). This one or more air purge valves (18) allow the propulsion source (10) to be able to work when the air flow rates are so low that they are within the pumping (release) area of the one or more electric compressors (14). As a result of the one or more air purge valves (18), the "flow rate of the supply air" parameter is made independent with respect to the "supply air pressure" parameter.

The flow rate of the supply air is determined by the actual operation of the propulsion source (10). However, the flow rate of the supply air is also indirectly affected by the operation of the one or more purge valves (18); so, due to their very nature, the one or more purge valves (18) may also allow certain regulation of the flow rate of the supply air, as a secondary function.

The one or more purge valves (18) are arranged in respective purge tubes, which emerge from the inlet tube (2) after the corresponding electric compressor (14), and flow into the outlet tube (4). Specifically, according to the embodiments shown in FIGS. 1, 2, and 3, the purge valve (18) associated with the first electric compressor (14) (i.e., with the electric compressor which is located upstream of the other electric compressor) is arranged in a purge tube which emerges from the inlet tube (2) between the two electric compressors (14) and flows into the outlet tube (4); the purge valve (18) associated with the second electric compressor (14) (i.e., with the other electric compressor which is located downstream of the first electric compressor) is arranged in another purge tube which emerges from the inlet tube (2) after the second electric compressor (14) and flows into the outlet tube (4).

In the case where the device for emulation has a cooling means (20) between the two electric compressors (14): Preferably and in a more advantageous manner, as shown in FIGS. 2 and 3, the purge tube corresponding to the first electric compressor (14), emerges from the inlet tube (2), between the electric compressor (14) and said cooling means (20). According to an alternative embodiment, this purge tube can emerge between the condensate separator (22) and the second electric compressor (14).

According to a preferred embodiment, the device for emulation comprises an air purge valve (18) associated with the compressor of the turbine set (12). This purge valve (18) is arranged in a respective purge tube, which emerges from the inlet tube (2) after the compressor of the turbine set (12) and flows into the outlet tube (4). Specifically, according to the embodiment shown in FIG. 3, this purge tube emerges from the inlet tube (2) between the compressor of the turbine set (12) and the first electric compressor (14). In this way, according to this embodiment, the device for emulation comprises three air purge valves (18); i.e., the two purge valves (18) associated with the electric compressors (14) (as mentioned above) and the purge valve (18) associated with the compressor of the turbine set (12).

In the case where the heating means (24) is the regenerator explained above, the purge tubes preferably flow into the outlet tube (4) downstream of the regenerator. For example, according to the embodiment shown in FIG. 3, the device for emulation comprises three purge tubes corresponding to the three purge valves (18), respectively; the three purge tubes flowing into the outlet tube (4), downstream of the regenerator.

According to a preferred embodiment, the one or more purge valves (18) are linearly regulating knife gate valves, preferably DN100, and more preferably Schuber & Saltzer GS type valves.

Optionally, in order to develop the functions of the one or more purge valves (18), other solutions can be implemented. For example, according to a particular embodiment, the electric compressors (14) have a different size and are arranged parallel to one another; such that, in this case, purge valves (18) are not required for controlling that the operating conditions of the electric compressors (14) are always suitable.

Optionally, the flow rate of the supply air can be regulated using other flow rate regulation means; for example, according to a particular embodiment, the flow rate of the supply air entering the propulsion source (10) is regulated by means of a flow rate regulating valve placed in the intake of the propulsion source (10).

According to a preferred embodiment, the device for emulation comprises a check valve (16), arranged in a bypass tube which bypasses the compressor of the turbine set (12). As shown in FIGS. 1, 2, and 3, this bypass tube emerges upstream of the compressor of the turbine set (12) and flows downstream thereof before the next electric compressor (14). Within the context of the present invention, "entry of air through the bypass tube" must be understood to mean the passage of air through the bypass tube towards the intake of the propulsion source (10); and "return of air through the bypass tube" must be understood to mean the passage of air through the bypass tube towards the suction end of the inlet tube (2). The check valve (16) is configured to prevent the return of the supply air through the bypass tube. Likewise, the check valve (16) is configured to prevent the entry of the supply air through the bypass tube when the outlet pressure of the compressor of the turbine set (12) is greater than or equal to the inlet pressure thereof, and otherwise to allow the entry of the supply air through the bypass tube to equalize both pressures. In this way, when the turbine of the turbine set (12) is not capable of recovering sufficient energy from the outlet gases, for example, during rapid acceleration processes, the check valve (16) helps to bypass the compressor of the turbine set (12), thereby preventing any detriment to the dynamic response of the device for emulation. Preferably, the check valve (16) is a DN100 check valve.

According to a preferred embodiment, the device for dynamic emulation comprises an additional cooling means (20), arranged in series with the one or more electric compressors (14). In this way, according to this preferred embodiment, the device for emulation comprises two cooling means (20), i.e., the aforementioned cooling means and the additional cooling means now mentioned.

According to the embodiments shown in FIGS. 2 and 3, one of the cooling means (20) is arranged between the two electric compressors (14); and the other cooling means is arranged downstream of the electric compressor which is located in the second place (by way of explanation, the one located in the second place is considered to be the one located downstream of the one located in the first place). Preferably, this other cooling means is arranged in one branch of the circuit of branches.

Preferably, the additional cooling means (20) is a heat exchange-type cooler. The additional cooling means (20) can use as a cooling source a suitable liquid coolant (such as water from a cooling tower, room temperature tap water, etc.), a reverse Rankine cycle-based cooling machine, etc. A combination of different types of cooling such as, for example, cooling with water from a cooling tower and cooling with a reverse Rankine cycle can also be used as a cooling source. According to a preferred embodiment, the additional cooling means (20) has a power of 15 kW.

Preferably, as shown in FIGS. 2 and 3, the cooling means (20) use the same cooling source.

According to a preferred embodiment, the device for emulation further comprises an air filter (28) at the suction end of the inlet tube (2), and a silencer (30) at the discharge end of the outlet tube (4), to clean impurities from the supply air and to reduce both suction and discharge noise of the outlet gases of the propulsion source (10).

According to a preferred embodiment, the device for emulation comprises:

One or more sensors for measuring operating parameters of the propulsion source (10), for example, supply air temperature in the intake, supply air pressure in the intake, outlet gas pressure in the exhaust.

A programmable automaton in communication with the one or more sensors, which is configured to control the operation of the device for emulation based on setpoint values and on the readings of the one or more sensors.

Although multiple embodiments are possible as described herein, the precise location of the elements according to the outlet gas and supply air flow diagrams shown in the figures has been designed to achieve the highest possible energy efficiency, utilizing the synergistic effects of different components. For example, the one or more electric compressors (14) heat up the air a lot, the turbine set (12) barely compresses and heats up, the one or more cooling means (20) generate condensates, the regenerator is located after the turbine of the turbine set (12) so as not to destroy exergy, etc.

By way of example, for the typology range of the engines used in passenger vehicles, with powers of between 30 kW and 150 kW, the features of the device for emulation of the present invention, according to a preferred embodiment are:

One or more electric compressors (14): 20 kW of total power, preferably with 11 kW for low pressure and 9 kW for high pressure.

Turbine set (12): 10 kW of power.

Heating means (24): 40 kW of power.

One or more cooling means (20): 15 kW of power each.

According to a preferred embodiment, the device further comprises other components with the following features:

The one or more purge valves (18) and the one or more mixing valves (26) are linearly regulating knife gate valves, preferably DN100, and the mixing valve (26) located at the outlet of the heating means (24) is a high-temperature valve (for example, of up to 550° C.).

The check valve (16) is DN100.

The one or more condensate separators (22) are axial cyclonic separators, designed specifically with NACA profiles to achieve suitable vorticity while minimizing head losses; and have a DN150 diameter.

The diameters of the tubes connecting the various components are DN50.

According to a second aspect, the present invention relates to a method for the dynamic emulation of forced induction systems of propulsion sources (10), using the device for emulation according to the first aspect of the present invention.

By means of this method, it is possible to dynamically emulate pressure and temperature variations experienced by the supply air in a forced induced propulsion source (10).

Generally, according to a particular embodiment of the present invention:

The pressure of the supply air can be regulated by means of controlling the rotation regime of the one or more electric compressors (14). Taking into account that the supply air is also heated when compressed, the control of the rotation regime of the one or more electric compressors (14) also allows regulating supply air temperature.

The counterpressure of the outlet gases of the propulsion source (10) can be regulated by means of controlling the turbine of the turbine set (12).

According to the preferred embodiment of the present invention, the method for emulation comprises suctioning air from the environment to use it as supply air for the propulsion source (10); feeding the supply air to the propulsion source (10); expelling to the environment outlet gases of the propulsion source (10); with the particularity that one or more of the following actions can be performed:

regulating supply air pressure by controlling the rotation regime of the one or more electric compressors (14);

controlling that the operating conditions of the one or more electric compressors (14) are always suitable, in terms of safety, preventing those conditions that may be hazardous for the electric compressors (14), the propulsion source (10), or other components of the device for emulation. This control is performed using a safety means preferably comprising the one or more purge valves (18).

regulating supply air temperature, using the heat regulation means;

regulating the counterpressure of the outlet gases of the propulsion source (10), by modifying the geometry of the turbine of the turbine set (12).

The method for emulation by means of a device for emulation of the present invention is set forth in more detail below:

First, air enters the inlet tube (2) from ambient conditions and passes into the compressor of the turbine set (12). The pressure and temperature of the supply air increase in the compressor of the turbine set (12).

In the preferred case where the device has the check valve (16) as shown in the figures: In the case of an abnormal operation in which the pressure at the outlet of the turbine set (12) is lower than the pressure at the inlet, the check valve (16) would open, allowing the entry of the supply air through the bypass tube and equalizing these pressures.

After passing through the compressor of the turbine set (12), the supply air passes through the one or more electric compressors (14), increasing its pressure and temperature once again in each electric compressor (14). The passage of the supply air through the compressor of the turbine set (12) and through the one or more electric compressors (14) is controlled in order to achieve the desired conditions of the supply air in the intake of the propulsion source (10).

In the case of the embodiments shown in FIGS. 2 and 3 in which the device has a cooling means (20) between two electric compressors (14) and a condensate separator (22) after said cooling means (20): before passing into the second electric compressor (14), the supply air passes through said cooling means (20) where the temperature thereof is lowered; and passes through said condensate separator (22) where water is removed from the moisture which has condensed after cooling in the cooling means (20).

In the case of embodiments with one or more purge valves (18) associated with the one or more electric compressors (14), such as the embodiments shown in the figures: the one or more purge valves (18) regulate the operating conditions of the one or more electric compressors (14), preventing operating conditions that are hazardous to them or to any component of the installation (installation being understood as the combination of the device for emulation and the propulsion source). In the case of the embodiment shown in FIG. 3 in which the device for emulation has a purge valve (18) associated with the compressor of the turbine set (12), this purge valve (18) regulates the operating conditions of the compressor, preventing hazardous operating conditions.

The one or more purge valves (18) can be opened, for example, in case of emergency.

According to a preferred embodiment, with a circuit of branches, cooling means (20) in one branch of the circuit of branches, heating means (24) in another branch, and the mixing valves (26) in the branches, such as the embodiments shown in the figures: After being compressed in the one or more electric compressors (14), the supply air enters the circuit of branches. Depending on the opening of the mixing valves (26), the supply air splits into different flows that flow through respective branches for heating by the heating means (24) or for cooling by the cooling means (20).

In the case of the embodiment shown in FIG. 2 in which the circuit of branches has three branches with one of them being intended for the passage of an airflow without temperature change: Depending on the opening of the mixing valves (26), the supply air splits into different flows that flow through the three branches for heating by the heating means (24), cooling by the cooling means (20), or for transport without being cooled or heated.

After the passage thereof through the branches, the different supply air flows at different temperatures are mixed to achieve the desired temperature. In this way, depending on the opening of the mixing valves (26), the supply air temperature can be varied.

According to a preferred embodiment, with a condensate separator (22) after the circuit of branches, such as the embodiments shown in the figures: After the temperature has been regulated, the supply air passes into the corresponding condensate separator (22) in which water is removed from the moisture that could have condensed after cooling the mixture.

Then, the supply air is introduced into the propulsion source (10). In the propulsion source (10), the supply air is used to generate propulsion energy, and outlet gases, which are at a high pressure and a high temperature, are generated.

The outlet gases expand in the turbine of the turbine set (12) which rotates mechanically coupled to the compressor of the turbine set (12). In the turbine, the gases expand lowering its pressure and temperature.

Outlet gases are then evacuated into the environment.

In the case where the heating means (24) is a regenerator as shown in the figures, before being evacuated into the atmosphere, the outlet gases pass through the regenerator and lower their temperature by heating the supply air that circulates through the branch of the heating means (24). After the regenerator, the outlet gases proceeding from the propulsion source (10) are discharged into the atmosphere.

According to a preferred embodiment, the method of the present invention comprises emulating one or more of the following time gradient ranges:

supply air pressure time gradient range from 5 bar/s to −5 bar/s.

counterpressure time gradient range of the outlet gases in the exhaust of the propulsion source (also referred to as exhaust counterpressure) from 5 bar/s to −15 bar/s.

supply air temperature time gradient range from 0.5° C./s to 5° C./s.

Furthermore, these gradients can be also achieved within very wide ranges of absolute pressure and temperature values (also independent of one another) with high accuracy:

according to a preferred embodiment, a precision and supply air absolute pressure range of 2.0-6.0 bar(A)±20 mbar is emulated.

according to a preferred embodiment, a precision and supply air absolute temperature range of 30-80° C.±0.5° C. is emulated.

According to a preferred embodiment, the device for emulation is controlled by a programmable automaton in communication with one or more sensors. The programmable automaton collects measurements from the one or more sensors which preferably measure the pressure and temperature in the intake of the propulsion source (10) and in the exhaust thereof. To regulate the values of these pressures and temperatures to the setpoint values required by a user, the programmable automaton comprises several control mechanisms, preferably PID controllers, which can act on the actuators of the installation:

A control mechanism for the one or more electric compressors (14), which regulates the intake pressure based on the rotation regime of the one or more engines coupled to the one or more electric compressors (14), respectively.

A control mechanism for the turbine of the turbine set (12), which regulates the outlet gas counterpressure based on the modification of the geometry of the turbine.

A control mechanism for the temperature regulation means, which regulates the intake supply air temperature, preferably based on the positioning of the one or more mixing valves (26).

According to a preferred embodiment, the programmable automaton also comprises a control mechanism for the safety means, preferably a PID controller, which regulates the operating conditions of the one or more electric compressors (14) so that these conditions are always suitable, in terms of safety. Preferably, this control mechanism regulates the operating conditions of the one or more electric compressors (14) based on the positioning of the one or more corresponding purge valves (18).

As set forth above, the device for emulation disclosed herein can simulate forced induction systems of propulsion sources, both in steady state and dynamic operating conditions. The device of the present invention allows independently controlling the intake pressure and the exhaust counterpressure of the propulsion source (10), so dynamic emulations can be carried out. The possibility of simulating the dynamic evolutions of the forced induction systems means that the device disclosed herein is singular and different from any other device for the simulation of forced induction systems of the prior art.

The device of the present invention is based on the combination of several compression means, specifically in a turbine set (12) and one or more electric compressors (14), to enable simulating accelerations and decelerations of turbine sets used in current propulsion sources such as, for example, reciprocating internal combustion engines or fuel cells. The operation of the device for emulation is based on recovering energy from the high-pressure outlet gases of the propulsion source (10) for the forced induction of the propulsion source (10) itself. The fact that the one or more electric compressors (14) are electrically operated allows very quick (very dynamic) responses. The compressor of the turbine set (12) helps to consume less electric energy in situations capable of providing positive compression ratios.

The operation of the device for emulation can also be supported by a cooling means (20), a heating means (24), and a heat regulation means which allows supply air temperature to be regulated independently of its pressure.

The device of the present invention constitutes a tool for designing propulsion sources and forced induction systems. As a result of the device of the present invention, it is possible to perform emulations using, as a basis, a "simplification" of the actual propulsion source by way of a mockup thereof with a single working unit (for example, a single-cylinder engine or a single-cell fuel cell). By way of explanation, in the case of reciprocating internal combustion engines, the working unit is a cylinder; similarly, in the case of fuel cells, the working unit is a cell. Herein, a multiple propulsion source refers to a propulsion source with several working units (for example, a multi-cylinder engine); and a simple propulsion source simple refers to a propulsion source with a single working unit (for example, a single-cylinder engine).

By way of example, the process carried out for designing an internal combustion engine forced induced by means of the device for emulation of the present invention is generally described below:

The device for emulation is coupled to the cylinder of a single-cylinder engine (development base engine) with specific characteristics (cylinder volume, stroke ratio, diameter, etc.).

The engine is subjected to different forced induction scenarios by means of the device for emulation.

To that end, different components of the device for emulation are acted upon by varying their operating parameters: for example, control of the rotation regimes of the one or more electric compressors (14), control of the supply air temperature using the temperature regulation means, control of the geometry of the turbine of the turbine set (12), etc.

The response of the engine is obtained.

The response of the engine is analyzed and possible changes in the cylinder are evaluated to improve the response of the engine.

If necessary, the preceding steps are repeated, but with the cylinder of the modified engine, and so on and so forth until finding an optimal solution.

Finally, the final engine is designed/manufactured with the required cylinders based on the optimal cylinder.

The design of other types of propulsion sources by means of the device for emulation of the present invention such as, for example, the design of fuel cells, is performed in a manner similar to that explained in the preceding paragraph. The steps are simply performed on the corresponding propulsion source, for example, a single-cell fuel cell, instead of on the cylinder of the single-cylinder engine.

The device for emulation can also be used as a design tool to specify the characteristics of the forced induction system that will perform best with the propulsion source (10). The process carried out for designing a forced induction system for a propulsion source (10) without forced induction by means of the device for emulation of the present invention is generally described below:

By means of the device for emulation, the propulsion source (10) is subjected to tests with different forced induction scenarios. To that end, different components of the device for emulation are acted upon by varying their operating parameters: for example, control of the rotation regimes of the one or more electric compressors (14), control of the supply air temperature using the temperature regulation means, control of the geometry of the turbine of the turbine set (12), etc.

The response of the propulsion source (10) is analyzed and possible changes in the parameters of the components of the device for emulation are evaluated to improve the response of the propulsion source (10).

If necessary, the preceding steps are repeated until finding an optimal solution for the forced induction system.

Finally, with the pressures, flow rates, temperatures, and gradients measured in the tests the forced induction system (turbomachines) is designed/manufactured, based on the technical solution that best reproduces the measured pressure and temperature ratios, the measured flow rates (suitably made dimensionless), and that generates and supports the measured gradients.

Since the device of the present invention allows emulations to be performed using, as a basis, a "simplification" of the actual propulsive source by way of a mockup thereof with a single working unit, the scale of the turbomachines used must necessarily be variable in terms of size and power. This scale must be adapted on one hand to the variety of propulsion sources, for example, to the variety of cylinder capacities of the engines used in automotive (passenger cars, light transport, heavy transport, railway, marine transport, light aviation, etc.), and on the other hand to the number of working units of multiple propulsion sources in comparison with a single propulsion source (for example, cylinders of the multi-cylinder engine in comparison with the single-cylinder engine (12/1, 6/1, 4/1, 3/1). The difficulty of developing a device for emulation flexible enough so as to reproduce pressure and temperature gradient ranges and to adapt to scaling requirements in a single architecture justifies the novelty of the present invention.

In this way, some important circumstances must be taken into account for the development of the device for emulation. The device for emulation must be capable of emulating with one and the same architecture multiple situations with different steady state and dynamic operating conditions. To that end, with the same architecture, it must be possible to vary the scale of the components of the emulator device, such as the turbine set, the one or more electric compressors, the cooling means, the heating means, the heat regulation means, etc.

Due to the design complexity of the actual device for emulation of the present invention, software for the simulation of reciprocating internal combustion engines and fluid systems has been used for its development. By means of this software it has been possible to calculate with the required level of precision the performance of the different components of the device for emulation in order to suitably size said components considering the influence of the (highly non-stationary) pulsating flows generated by the propulsion source on the performance of the device for dynamic emulation.

By way of example, the process carried out for designing the device for emulation by means of the software for application thereof in reciprocating internal combustion engines is generally described below:

First, a proposal of the device for emulation coupled to a propulsion source (10) with a single working unit, in this case a single-cylinder engine (which proposal corresponds to a virtual model of the device for emulation) is entered in the software, according to a distribution and specific characteristics of the components; which characteristics are obtained, for example, from supplier data and/or empirical data.

Based on the entered proposal, different scenarios are simulated with the software, varying the operating parameters of one or more components in each simulation.

The result of the simulation is compared with reference values corresponding to actual forced induction systems.

If the simulated response deviates from the actual response (reference values), some of the characteristics of the device for emulation are modified, the same validation process is performed again (i.e., entering the proposal in the software, simulating different scenarios, and comparing with reality), and so on and so forth until the result is optimal, i.e., when the result is close enough to the reality.

Once the proposal has been validated, the device for emulation is manufactured according to said validated proposal.

The design of the device for emulation of the present invention for application thereof to other types of propulsion sources such as, for example, fuel cells, is performed in a manner similar to that explained in the preceding paragraph. The steps are simply performed on the corresponding propulsion source, for example, a fuel cell, instead of the combustion engine.

Based on the foregoing, the device and method of the present invention allows emulating dynamic operating conditions (i.e., in transient state) and steady state operating conditions of forced induced propulsion sources; conditions imposed by a user based, for example, on optimization and design criteria.

The user can perform steady state and dynamic emulations of a forced induced propulsion source, so as to be able to design and develop said propulsion source and/or the forced induction system. This is very useful, for example, in the case of designing and/or improving forced induced racing engines. Normally, for designing and/or improving racing engines, the engine is mounted in the racing vehicle and long track test sessions are performed. In the test sessions, the driver subjects the engine to multiple forced induction scenarios (different accelerations, decelerations, speeds, etc.) in order to obtain, by means of sensors, as much data as possible on the response of the engine and of the forced induction system. By means of the present invention, a large part of said data can be obtained without having to perform these track tests with the racing vehicle, which allows greatly reducing costs.

Although the present invention has been described herein in reference to preferred embodiments thereof, those skilled in the art will understand that various modifications and variations can be applied to said described embodiment without thereby departing from the scope of protection defined by the following attached claims.

The invention claimed is:

1. A device for the dynamic emulation of forced induction systems of propulsion sources, comprising:
   an inlet tube configured to be connected at one end to an intake of a propulsion source, and to suction air from the environment at the other end, referred to as suction end, for using the air suctioned from the environment as supply air for the propulsion source;
   an outlet tube configured to be connected at one end to an exhaust of the propulsion source, and to expel outlet gases of the propulsion source into the environment at the other end, referred to as discharge end;
   a turbine set comprising a turbine with a variable geometry in the outlet tube and a compressor in the inlet tube, coupled to the turbine, such that the turbine set is configured so that the turbine meets the counterpressure gradients of the outlet gases and recovers part of the energy available in said gases to compress the supply air by means of the compressor;
   one or more electric compressors in the inlet tube, placed in series with the compressor of the turbine set, configured to compress the supply air and reproduce in a controlled manner pressure gradients of the supply air;
   a cooling means arranged in series with the one or more electric compressors, configured to cool the supply air;
   a heating means configured to heat the supply air;
   a heat regulation means for the supply air, configured to regulate the mixture of at least one cold supply air flow proceeding from the cooling means and a hot supply air flow proceeding from the heating means, and to thereby regulate supply air temperature independently with respect to the pressure thereof; and
   a check valve in a bypass tube which bypasses the compressor of the turbine set, the check valve being configured to prevent the entry of supply air through the bypass tube when the outlet pressure of the compressor of the turbine set is greater than or equal to the inlet pressure thereof, and otherwise to allow the entry of supply air through the bypass tube to equalize both pressures.

2. The device according to claim 1, wherein the turbine of the turbine set is a centripetal radial turbine; and the one or more electric compressors are radial centrifugal compressors.

3. The device according to claim 1, wherein the electric compressors are placed in series with respect to one another.

4. The device according to claim 1, wherein the cooling means is a heat exchange-type cooler.

5. The device according to claim 1, wherein the heating means is a regenerator, configured to recover heat from the outlet gases of the propulsion source that circulate through the outlet tube and to use said heat in heating the supply air that circulates through the inlet tube.

6. The device according to claim 1, wherein:
   the heat regulation means is integrated in a circuit of parallel branches, such that the heating means is arranged in one of the branches and the cooling means is arranged in another branch; and the heat regulation means comprises one or more mixing valves arranged in one or more of the branches, respectively, regulating the flow rate of the supply air flow through the corresponding branch thereof.

7. The device according to claim 6, wherein:

one of the branches of the circuit of branches runs without going through any heating or cooling means, such that the supply air flow that circulates through this branch does not experience temperature change; and one of the mixing valves is arranged in the branch of the heating means and is a high-temperature valve, with an operating temperature of up to 550° C.

8. The device according to claim 6, wherein the one or more mixing valves are linearly regulating knife gate valves.

9. The device according to claim 1, comprising:

a safety means configured to control that the operating conditions of the one or more electric compressors are always suitable, in terms of safety, the safety means comprising one or more air purge valves associated with the one or more electric compressors, respectively; and an air purge valve associated with the compressor of the turbine set.

10. The device according to claim 9, wherein the one or more purge valves are linearly regulating knife gate valves.

11. The device according to claim 1, comprising one or more condensate separators, configured to remove condensed water from the moist supply air.

12. The device according to claim 11, wherein the one or more condensate separators are axial cyclonic separators.

13. The device according to claim 1, comprising an additional cooling means arranged in series with the one or more electric compressors.

14. The device according to claim 1, comprising:

at least one sensor for measuring operating parameters of the propulsion source, the operating parameters of the propulsion source including one or more of supply air temperature in the intake, supply air pressure in the intake, and outlet gas pressure in the exhaust, and a programmable automaton in communication with the at least one sensor, the programmable automaton configured to control the operation of the device based on setpoint values and on one or more readings of the at least one sensor.

15. The device according to claim 1, wherein the propulsion source is selected from the group consisting of a reciprocating internal combustion engine and a fuel cell.

16. A method for the dynamic emulation of forced induction systems of propulsion sources using the device according to claim 1, comprising suctioning air from the environment to use it as supply air for the propulsion source; feeding the supply air to the propulsion source; expelling to the environment outlet gases of the propulsion source; wherein the method comprises performing one or more of the following actions:

regulating supply air pressure by controlling the rotation regime of the one or more electric compressors;

controlling that the operating conditions of the one or more electric compressors are always suitable, using a safety means;

regulating supply air temperature, using the heat regulation means; and regulating the counterpressure of the outlet gases of the propulsion source, by modifying the geometry of the turbine of the turbine set.

17. The method according to claim 16, comprising emulating one or more of the following time gradient ranges:

supply air pressure time gradient range from 5 bar/s to −5 bar/s by controlling the rotation regime of the one or more electric compressors;

counterpressure time gradient range of the outlet gases of the propulsion source from 5 bar/s to −15 bar/s, by modifying the geometry of the turbine of the turbine set; and supply air temperature time gradient range from 0.5° C./s to 5° C./s by using the heat regulation means.

18. The method according to claim 16, comprising:

emulating a precision and supply air absolute pressure range of 2.0-6.0 bar (A)±20 mbar by controlling the rotation regime of the one or more electric compressors; and emulating a precision and supply air absolute temperature range of 30-80° C.±0.5° C. by using the heat regulation means.

19. The method according to claim 16, wherein the control of the device for emulation is performed by a programmable automaton based on the readings of a plurality of sensors which measure the pressure and temperature in the intake of the propulsion source and in the exhaust thereof.

\* \* \* \* \*